(12) United States Patent
Kurata

(10) Patent No.: US 10,787,975 B2
(45) Date of Patent: Sep. 29, 2020

(54) VEHICLE CONTROL DEVICE

(71) Applicant: SUZUKI MOTOR CORPORATION, Hamamatsu-shi, Shizuoka (JP)

(72) Inventor: Koji Kurata, Hamamatsu (JP)

(73) Assignee: SUZUKI MOTOR CORPORATION, Hamamatsu-shi, Shizuoka (JP)

(*) Notice: Subject to any disclaimer, the term of this patent is extended or adjusted under 35 U.S.C. 154(b) by 182 days.

(21) Appl. No.: 15/868,097

(22) Filed: Jan. 11, 2018

(65) Prior Publication Data

US 2018/0216545 A1    Aug. 2, 2018

(30) Foreign Application Priority Data

Jan. 30, 2017 (JP) ................. 2017-014558

(51) Int. Cl.
*F02D 29/02* (2006.01)
*F02D 41/10* (2006.01)
(Continued)

(52) U.S. Cl.
CPC ........ *F02D 29/02* (2013.01); *B60W 30/18027* (2013.01); *F02B 61/02* (2013.01);
(Continued)

(58) Field of Classification Search
CPC ........ F02D 29/02; F02D 41/10; F02D 41/021; F02D 11/105; F02D 2200/501; F02D 2200/702; F02D 2200/602; F02D 41/0002; F02D 41/30; F02D 2200/701; B60W 30/18027; B60W 2710/0616; B60W 2710/0605; B60W 2550/402; B60W 2550/142; B60W 2540/10; B60W 2530/10; B60W 2520/18; B60W 2520/10; B60W 2520/04; B60W 2300/36; B60W 40/076; B60W 50/08; B60W 50/082; B60W 50/085; B60W 50/087; B60W 50/10; B60W 50/12; G01P 3/00; F02B 61/02; Y02T 10/42;
(Continued)

(56) References Cited

U.S. PATENT DOCUMENTS

2008/0161158 A1* 7/2008 Kojima ............ F16H 61/0213
                                                  477/120
2015/0032355 A1* 1/2015 Fujito ............... F02D 11/105
                                                  701/99

FOREIGN PATENT DOCUMENTS

JP      2005-171806 A     6/2005
JP      2005171806 A  *   6/2005

* cited by examiner

*Primary Examiner* — Joseph J Dallo
*Assistant Examiner* — Scott A Reinbold
(74) *Attorney, Agent, or Firm* — Stein IP, LLC

(57) ABSTRACT

A vehicle control device includes: an on-vehicle object recognizing portion that recognizes whether an on-vehicle object that is a person other than a driver or a luggage is present on a saddle-ridden type vehicle; a stop position recognizing portion that recognizes whether the saddle-ridden type vehicle has stopped in middle of or immediately before an uphill slope; and an engine control portion that controls an engine output in the saddle-ridden type vehicle, and, when the on-vehicle object is present on the saddle-ridden type vehicle and the saddle-ridden type vehicle has stopped in middle of or immediately before the uphill slope based on recognition results of the on-vehicle object recognizing portion and the stop position recognizing portion, the engine control portion performs engine output increase control as defined herein.

12 Claims, 5 Drawing Sheets

(51) Int. Cl.
    *B60W 30/18*       (2012.01)
    *F02D 41/02*       (2006.01)
    *F02B 61/02*       (2006.01)
    *F02D 41/00*       (2006.01)
    *F02D 41/30*       (2006.01)
    *G01P 3/00*        (2006.01)
    *F02D 11/10*       (2006.01)
    *G01C 9/02*        (2006.01)
    B62J 45/40       (2020.01)
    G01G 19/08      (2006.01)

(52) U.S. Cl.
    CPC ....... *F02D 41/0002* (2013.01); *F02D 41/021* (2013.01); *F02D 41/10* (2013.01); *F02D 41/30* (2013.01); *G01P 3/00* (2013.01); *B60W 2300/36* (2013.01); *B60W 2520/04* (2013.01); *B60W 2520/10* (2013.01); *B60W 2520/18* (2013.01); *B60W 2530/10* (2013.01); *B60W 2540/10* (2013.01); *B60W 2552/15* (2020.02); *B60W 2556/50* (2020.02); *B60W 2710/0605* (2013.01); *B60W 2710/0616* (2013.01); *B62J 45/40* (2020.02); *F02D 11/105* (2013.01); *F02D 2200/501* (2013.01); *F02D 2200/602* (2013.01); *F02D 2200/701* (2013.01); *F02D 2200/702* (2013.01); *G01C 9/02* (2013.01); *G01G 19/08* (2013.01); *Y02T 10/40* (2013.01)

(58) Field of Classification Search
    CPC ...... B62K 2207/00; G01C 9/02; G01G 19/08; F16H 2061/0227
    USPC ........................................................ 701/104
    See application file for complete search history.

(CONT.)

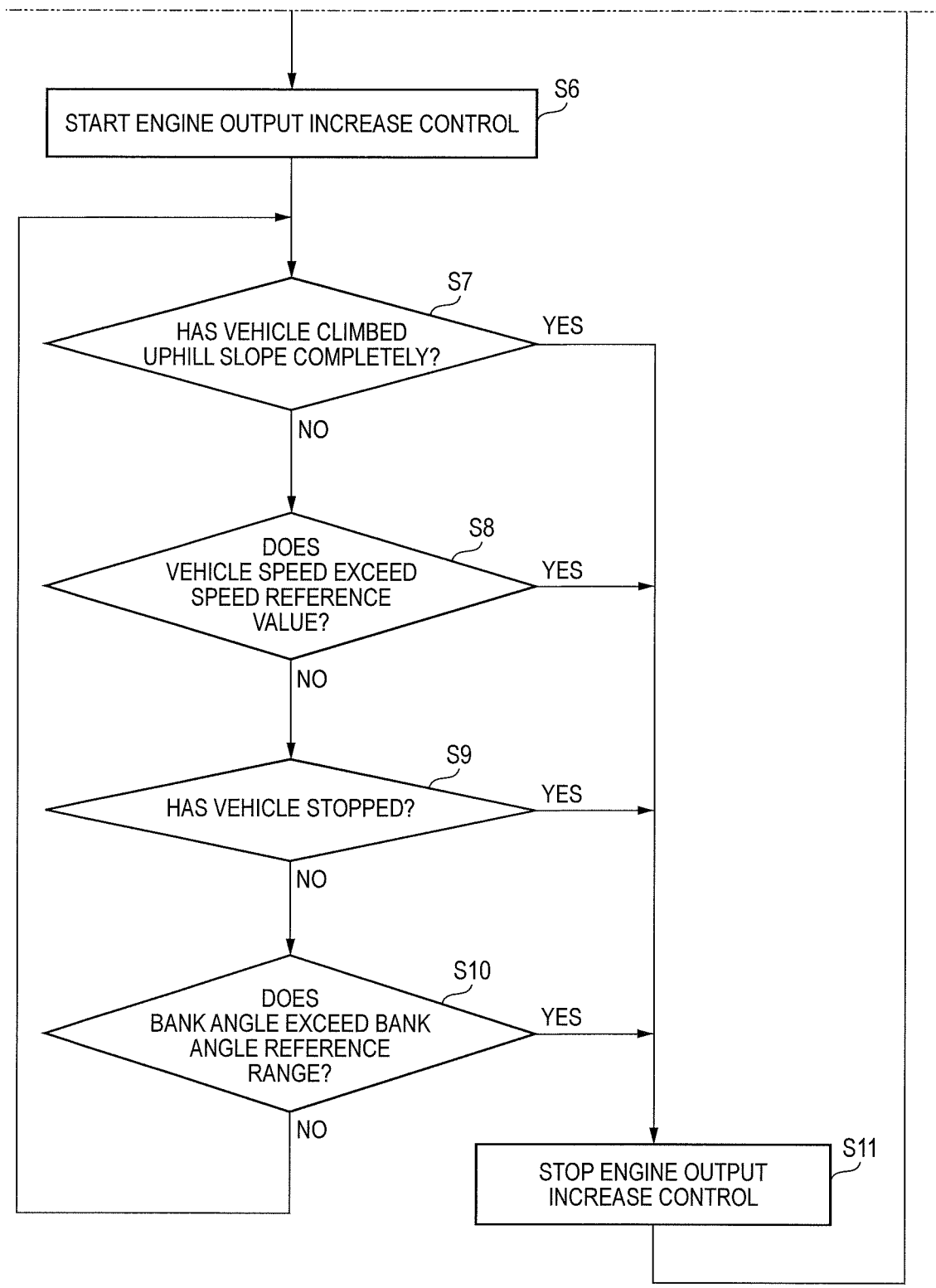
(FIG. 4 Continued)

VEHICLE CONTROL DEVICE

CROSS-REFERENCE TO RELATED APPLICATIONS

This application claims the benefit of Japanese Patent Application JP 2017-014558, filed Jan. 30, 2017, the entire content of which is hereby incorporated by reference, the same as if set forth at length.

FIELD OF THE INVENTION

The present invention relates to a vehicle control device which performs control when a saddle-ridden type vehicle starts.

BACKGROUND OF THE INVENTION

A vehicle backward movement preventing device which can prevent a vehicle from moving backward when the vehicle which has stopped in the middle of an uphill slope starts has been described in the following JP-A-2005-171806. Assume that determination is made that the vehicle is positioned on an uphill slope and determination is made that the vehicle is in a stop state. In this case, the vehicle backward movement preventing device controls an electronic control throttle valve to increase a displacement of a throttle opening with respect to an accelerator operation amount when determination is made that the vehicle has been changed to a non-braking state.

SUMMARY OF THE INVENTION

In operations of a saddle-ridden type vehicle performed by a driver, an operation of starting the saddle-ridden type vehicle from the middle of an uphill slope (hereinafter referred to as "middle-of-slope start operation") is required to be performed more carefully than an operation of starting the saddle-ridden type vehicle from the middle of a horizontal road. However, when one person (i.e. the driver alone) is riding on the saddle-ridden type vehicle and no luggage is carried on the saddle-ridden type vehicle, it is not difficult for the driver to perform the middle-of-slope start operation as long as the driver has normal driving skill of the saddle-ridden type vehicle.

On the other hand, when two persons (i.e. the driver and a passenger) are riding on the saddle-ridden type vehicle or a luggage is carried on the saddle-ridden type vehicle, it is difficult for the driver to perform the middle-of-slope start operation as long as the driver is inexperienced at driving in such a state even if the driver has normal driving skill of the saddle-ridden type vehicle.

That is, when the two persons are riding on the saddle-ridden type vehicle or the luggage is carried on the saddle-ridden type vehicle, the center of gravity of the saddle-ridden type vehicle moves upward as a whole. Accordingly, the vehicle is apt to run zigzag in a left/right direction when the vehicle starts at low speed. In addition, the gravity in an opposite direction to a direction of climbing the uphill slope is applied to the vehicle simultaneously when the weight of the two riders or the luggage is added to the vehicle. For this reason, acceleration of the vehicle is slowed down so that it is difficult for the driver to predict an acceleration rate of the vehicle with respect to an accelerator operation amount. Therefore, it is difficult for the driver to perform the middle-of-slope start operation when the two persons are riding on the saddle-ridden type vehicle or the luggage is carried on the saddle-ridden type vehicle.

In addition, the same thing can be also applied to an operation of starting the saddle-ridden type vehicle immediately before the uphill slope (hereinafter referred to as "immediately-before-slope start operation") in the operations of the saddle-ridden type vehicle performed by the driver. That is, even in a case where the vehicle which has stopped at a horizontal place immediately before the uphill slope starts toward the uphill slope, the vehicle begins to climb the uphill slope immediately after the vehicle starts. Accordingly, the vehicle encounters a similar situation to the case where the vehicle starts from the middle of the uphill slope. Therefore, it is also difficult for the driver to perform the immediately-before-slope start operation when the two persons are riding on the saddle-ridden type vehicle or the luggage is carried on the saddle-ridden type vehicle.

In addition, the vehicle backward movement preventing device according to JP-A-2005-171806 is considered to be aimed not at the saddle-ridden type vehicle but at a four-wheeled vehicle. It is difficult to use the vehicle backward movement preventing device according to JP-A-2005-171806 to solve the problem unique to the saddle-ridden type vehicle, in which difficulty of the middle-of-slope start operation and the immediately-before-slope start operation is conspicuous due to the double riding or the carriage of the luggage.

The invention has been accomplished, for example, in consideration of the aforementioned problem. An object of the invention is to provide a vehicle control device which can property support a saddle-ridden type vehicle to start from the middle of or immediately before an uphill slope in accordance with the number of riders or carriage/non-carriage of luggage.

To solve the problem, a vehicle control device of the invention comprises: an on-vehicle object recognizing portion that recognizes whether an on-vehicle object that is a person other than a driver or a luggage is present on a saddle-ridden type vehicle or not; a stop position recognizing portion that recognizes whether the saddle-ridden type vehicle has stopped in the middle of or immediately before an uphill slope or not; and an engine control portion that controls an engine output in the saddle-ridden type vehicle; wherein: when the on-vehicle object is present on the saddle-ridden type vehicle and the saddle-ridden type vehicle has stopped in the middle of or immediately before the uphill slope based on the recognition results of the on-vehicle object recognizing portion and the stop position recognizing portion, the engine control portion performs engine output increase control to increase the engine output with respect to an accelerator opening in the saddle-ridden type vehicle during start of the saddle-ridden type vehicle, in comparison with when the on-vehicle object is not present on the saddle-ridden type vehicle and the saddle-ridden type vehicle has stopped in the middle of or immediately before the uphill slope or when the on-vehicle object is present on the saddle-ridden type vehicle and the saddle-ridden type vehicle has stopped at a horizontal place not immediately before the uphill slope.

According to the invention, it is possible to properly support the saddle-ridden type vehicle to start from the middle of or immediately before an uphill slope in accordance with the number of riders or carriage/non-carriage of luggage.

BRIEF DESCRIPTION OF THE DRAWINGS

FIGS. 5-1, 5-2, 5-3 and 5-4 are explanatory views showing states in which the saddle-ridden type vehicle on which two persons are riding or the saddle-ridden type vehicle on which a luggage is carried has stopped in the middle of an uphill slope.

Figure 1:
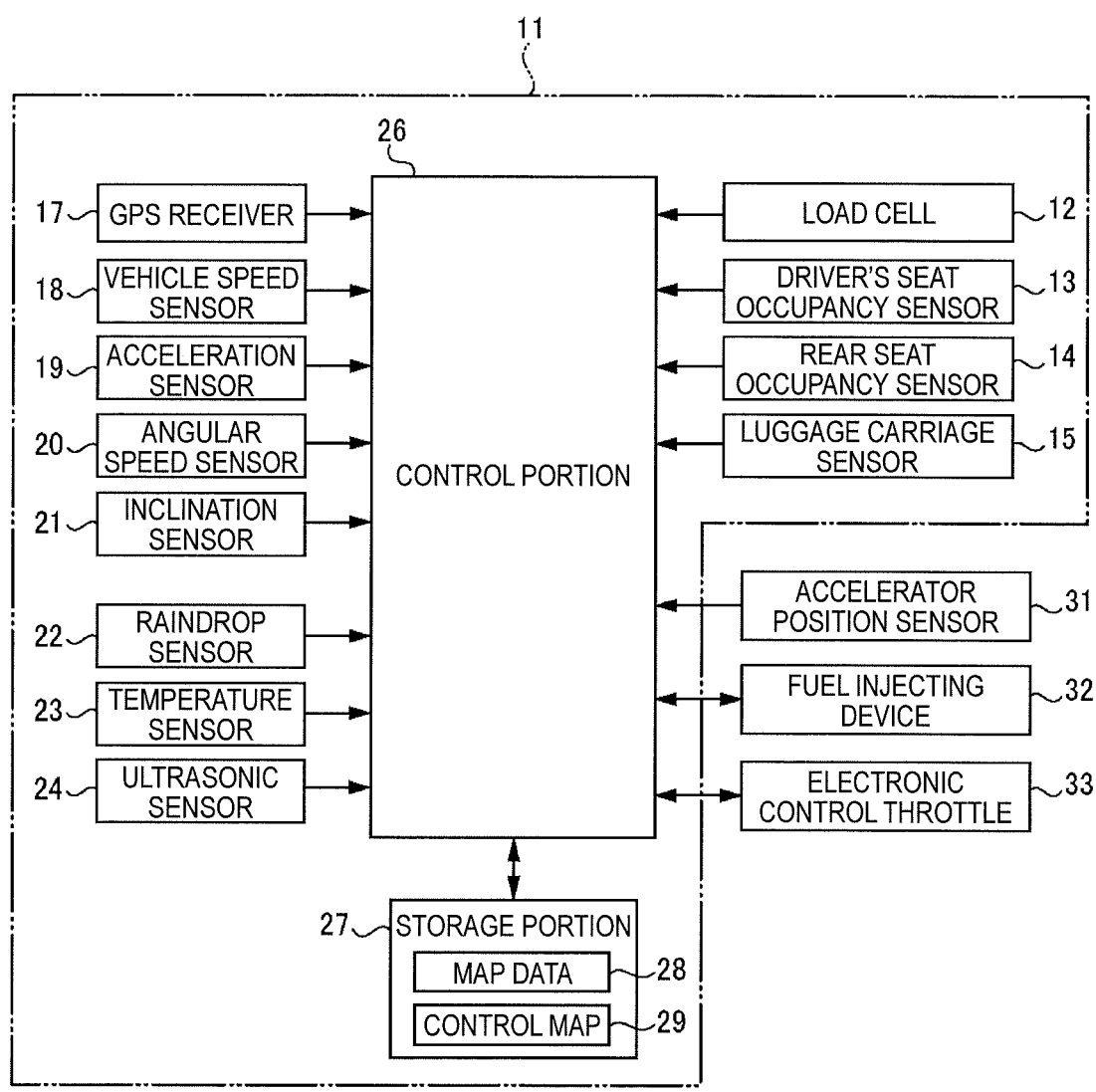
FIG. 1 is a block diagram showing the configuration of a vehicle control device according to an Example of the invention.

REFERENCE SIGNS LIST 11 vehicle control device
12 load cell (weight detecting portion)
14 rear seat occupancy sensor (on-vehicle object recognizing portion)
15 luggage carriage sensor (on-vehicle object recognizing portion)
17 GPS receiver (stop position recognizing portion)
18 vehicle speed sensor (stop position recognizing portion, speed detecting portion)
19 acceleration sensor (stop position recognizing portion)
20 angular speed sensor (stop position recognizing portion)
21 inclination sensor (inclination detecting portion)
26 control portion (on-vehicle object recognizing portion, stop position recognizing portion, engine control portion, gradient detecting portion)
27 storage portion
28 map data
29 control map
31 accelerator position sensor
32 fuel injecting device
33 electronic control throttle (throttle)
41 saddle-ridden type vehicle
54 engine
56 seat
57 driver's seat
58 rear seat
59 carrier

DETAILED DESCRIPTION OF THE INVENTION

A vehicle control device according to an embodiment of the invention is provided with an on-vehicle object recognizing portion that recognizes whether at least one on-vehicle object is present on a saddle-ridden type vehicle or not, a stop position recognizing portion that recognizes whether the saddle-ridden type vehicle has stopped in the middle of or immediately before an uphill slope or not, and an engine control portion that controls an engine output in the saddle-ridden type vehicle.

The "on-vehicle object" is a person other than a driver or a luggage. For example, in a case where a piece of luggage is carried on the saddle-ridden type vehicle, the piece of luggage corresponds to the on-vehicle object. In this case, the on-vehicle object recognizing portion recognizes that the on-vehicle object is present on the saddle-ridden type vehicle. In addition, when two persons are riding on the saddle-ridden type vehicle, i.e. a person as well as the driver is riding on the saddle-ridden type vehicle, the person corresponds to the on-vehicle object. Also in this case, the on-vehicle object recognizing portion recognizes that the on-vehicle object is present on the saddle-ridden type vehicle. In addition, in a case where two persons are riding on the saddle-ridden type vehicle and a piece of luggage is also carried thereon, the person other than the driver and the piece of luggage correspond to the on-vehicle objects respectively. In this case, the on-vehicle object recognizing portion recognizes that at least one piece (or one person) of the on-vehicle object is present on the saddle-ridden type vehicle.

In addition, when the on-vehicle object is present on the saddle-ridden type vehicle and the saddle-ridden type vehicle has stopped in the middle of or immediately before the uphill slope based on the recognition results of the on-vehicle object recognizing portion and the stop position recognizing portion, the engine control portion increases the engine output with respect to an accelerator opening in the saddle-ridden type vehicle during start of the saddle-ridden type vehicle, in comparison with (1) when the on-vehicle object is not present on the saddle-ridden type vehicle and the saddle-ridden type vehicle has stopped in the middle of or immediately before the uphill slope or (2) when the on-vehicle object is present on the saddle-ridden type vehicle and the saddle-ridden type vehicle has stopped at a horizontal place not immediately before the uphill slope.

According to the vehicle control device according to the embodiment of the invention, when the saddle-ridden type vehicle ridden by the two persons or having the luggage carried thereon starts from the middle of or immediately before the uphill slope, the engine output with respect to the accelerator opening increases and engine torque increases, in comparison with when the saddle-ridden type vehicle ridden by one person and having no luggage carried thereon starts from the middle of or immediately before the uphill slope (or when the saddle-ridden type vehicle ridden by the two persons or having the luggage carried thereon starts from a horizontal place not immediately before the uphill slope). Accordingly, the vehicle can be started smoothly even in a case where an accelerator operation amount when the saddle-ridden type vehicle ridden by the two persons or having the luggage carried thereon starts from the middle of or immediately before the uphill slope is equal to an accelerator operation amount when the saddle-ridden type vehicle ridden by one person and having no luggage carried thereon starts from the middle of or immediately before the uphill slope (or an accelerator operation amount when the saddle-ridden type vehicle ridden by the two persons or having the luggage carried thereon starts from a horizontal place not immediately before the uphill slope).

Thus, when the saddle-ridden type vehicle ridden by the two persons or having the luggage carried thereon starts from the middle of or immediately before the uphill slope, the vehicle can be suppressed from running zigzag in a left/right direction. In addition, acceleration of the vehicle with respect to the accelerator operation amount when the saddle-ridden type vehicle ridden by the two persons or having the luggage carried thereon starts from the middle of or immediately before the uphill slope is equivalent to that when the saddle-ridden type vehicle ridden by one person with no luggage starts from the middle of or immediately before the uphill slope (or when the saddle-ridden type vehicle ridden by the two persons or having the luggage carried thereon starts from a horizontal place not immediately before the uphill slope). Accordingly, it is easy for the driver to predict an acceleration rate of the vehicle with respect to the accelerator operation amount. Thus, the driver can easily perform the middle-of-slope start operation and the immediately-before-slope start operation in the double riding state or the luggage carriage state.

Figure 2:
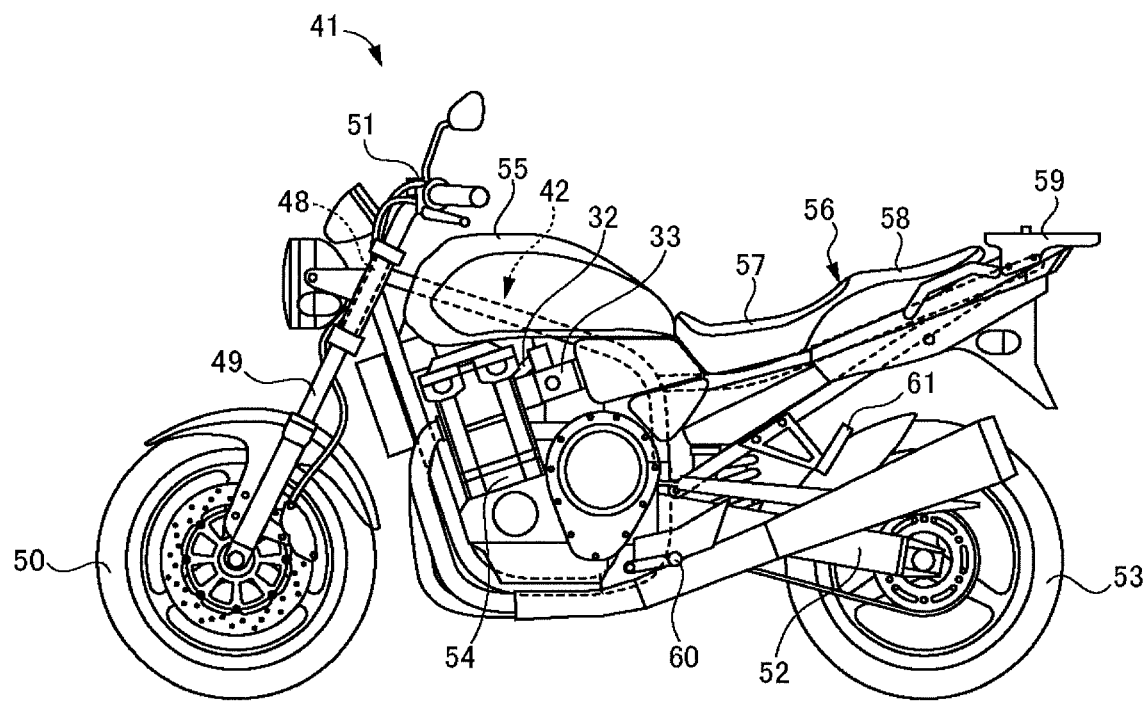
FIG. 2 is an explanatory view showing a saddle-ridden type vehicle provided with the vehicle control device according to the Example of the invention.
Figure 3:
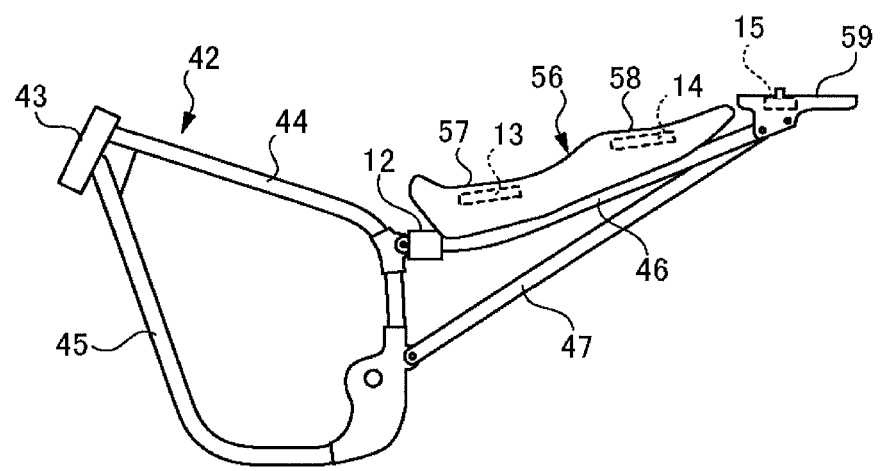
FIG. 3 is an explanatory view showing a vehicle body frame, a seat, a carrier, a load cell, seat occupancy sensors and a luggage carriage sensor of the saddle-ridden type vehicle in FIG. 2.

FIG. 1 shows the configuration of a vehicle control device 11 according to an Example of the invention. FIG. 2 shows a saddle-ridden type vehicle 41 in which the vehicle control device 11 is provided. FIG. 3 shows a vehicle body frame 42 and a seat 56 etc. of the saddle-ridden type vehicle 41.

The vehicle control device 11 is a device which supports the saddle-ridden type vehicle to start from the middle of or immediately before an uphill slope in accordance with the number of riders or carriage/non-carriage of luggage on the saddle-ridden type vehicle. The vehicle control device 11 is provided in the saddle-ridden type vehicle 41 shown in FIG. 2.

The saddle-ridden type vehicle 41 has the following configuration. That is, in FIG. 2, a steering shaft 48 is supported rotatably on a front end portion of the vehicle body frame 42 of the saddle-ridden type vehicle 41. A front fork 49 is fixed to the steering shaft 48 through a bracket. A front wheel 50 is supported rotatably on a lower end portion of the front fork 49. In addition, a handle 51 is fixed to the steering shaft 48 through a bracket. In addition, a swing arm 52 is supported swingably on a lower rear portion of the vehicle body frame 42, and a rear wheel 53 is supported rotatably on a rear end portion of the swing arm 52. In addition, an engine 54 is provided in a front/rear-direction intermediate portion of the vehicle body frame 42, and a fuel tank 55 is provided above the engine 54.

In addition, a seat 56 is provided at the rear of the fuel tank 55. A driver's seat 57 on which a driver sits and a rear seat 58 on which a passenger sits are formed integrally with each other in the seat 56 in the Example. The driver's seat 57 is disposed at a front portion of the seat 56. The rear seat 58 is disposed at a rear portion of the seat 56. Further, a carrier 59 is provided at the rear of the seat 56. The carrier 59 is a luggage rack for carrying luggage. In addition, a pair of left and right driver steps 60 (only a driver step 60 on a left side is illustrated) on which the driver sitting on the driver's seat 57 puts his/her feet are provided substantially under the driver's seat 57. In addition, a pair of left and right passenger steps 61 (only a passenger step 61 on the left side is illustrated) on which the passenger sitting on the rear seat 58 puts his/her feet are provided substantially under the rear seat 58.

As shown in FIG. 3, the vehicle body frame 42 is constituted by a head pipe 43, main frames 44, down tubes 45, seat rails 46, side frames 47, etc. The main frames 44, the down tubes 45, the seat rails 46 and the side frames 47 are provided to be paired with each other respectively, and arranged side by side in the left and right direction. Only the ones of the main frames 44, the down tubes 45, the seat rails 46 and the side frames 47 disposed on the left side are illustrated in FIG. 3.

The head pipe 43 is a tubular member which supports the steering shaft 48. Each of the main frames 44 extends rearward from an upper portion of the head pipe 43. Each of the down tubes 45 extends rearward and downward from a lower portion of the head pipe 43. In addition, the pair of the main frames 44 expand in the left and right direction in the vicinity of the head pipe 43, and then extend rearward substantially in parallel with each other and side by side in the left-right direction. The same thing is also applied to the pair of the down tubes 45. A space for housing the engine 54 is formed by the pair of the main frames 44 and the pair of the down tubes 45.

In addition, the pair of the seat rails 46 extend rearward from upper rear portions of the pair of the main frames 44. In addition, the pair of the side frames 47 extend rearward from lower rear portions of the pair of the main frames 44. Rear end portions of the pair of the side frames 47 are coupled to rear end portions of the pair of the seat rails 46.

The seat 56 is provided on the pair of the seat rails 46. In addition, the carrier 59 is provided on the rear end portions of the pair of the seat rails 46. Each of the seat rails 46 and each of the side frames 47 support the seat 56 and the carrier 59. In addition, a load cell 12 which will be described later is provided on a front end portion of each of the seat rails 46. In addition, a driver's seat occupancy sensor 13, a rear seat occupancy sensor 14 and a luggage carriage sensor 15 which will be described later are provided in the driver's seat 57, the rear seat 58 and the carrier 59 respectively.

On the other hand, the vehicle control device 11 has the following configuration. That is, as shown in FIG. 1, the vehicle control device 11 is provided with the load cell 12, the driver's seat occupancy sensor 13, the rear seat occupancy sensor 14 and the luggage carriage sensor 15.

The load cell 12 is a device which is provided on the paired seat rails 46 to measure force applied from above the pair of the seat rails 46, and which, for example, includes a strain sensor. In the Example, the load cell 12 is provided on the front end portion of the left seat rail 46, as shown in FIG. 3. Incidentally, the load sensor 12 may be provide on the front end portion of the right seat rail 46. A pair of load cells 12 may be provided on the front end portions of the left and right seat rails 46 respectively. A total weight etc. of the weight of the driver (person sitting on the driver's seat 57), the weight of the passenger (person sitting on the rear seat 58), and the weight of luggage carried on the carrier 59 or the rear seat 58 can be measured by the load cell 12. The strain sensor of the load sensor 12 outputs a detection signal corresponding to the aforementioned total weight to a control portion 26 of the vehicle control device 11. Incidentally, the load cell 12 is a specific example of a weight detecting portion.

The driver's seat occupancy sensor 13 is a sensor which detects that a person (driver) is sitting on the driver's seat 57. As shown in FIG. 3, the driver's seat occupancy sensor 13 is provided inside a portion corresponding to the driver's seat 57 in the seat 56. For example, the driver's seat occupancy sensor 13 is provided with a membrane switch. As soon as a person has sat on the driver's seat 57, the membrane switch of the driver's seat occupancy sensor 13 is turned ON. Accordingly, it is possible to detect whether a person has sat on the driver's seat 57 or not, based on ON/OFF of the membrane switch. When the membrane switch of the driver's seat occupancy sensor 13 is ON, the driver's seat occupancy sensor 13 outputs an ON signal to the control portion 26. On the other hand, when the membrane switch of the driver's seat occupancy sensor 13 is OFF, the driver's seat occupancy sensor 13 outputs an OFF signal to the control portion 26.

The rear seat occupancy sensor 14 is a sensor which detects that a person (passenger) is sitting on the rear seat 58 or that luggage is carried on the rear seat 58. As shown in FIG. 3, the rear seat occupancy sensor 14 is provided inside a portion corresponding to the rear seat 58 in the seat 56. For example, the rear seat occupancy sensor 14 is provided with a membrane switch. As soon as a person has sat on the rear seat 58, the membrane switch of the rear seat occupancy sensor 14 is turned ON. In addition, also as soon as, for example, a piece of luggage weighing 5 kg or more is carried on the rear seat 58, the membrane switch of the rear seat occupancy sensor 14 is turned ON. Accordingly, based on ON/OFF of the membrane switch, it is possible to detect whether the person has sat on the rear seat 58 or not or whether the piece of luggage is carried on the rear seat 58 or not. When the membrane switch of the rear seat occupancy sensor 14 is ON, the rear seat occupancy sensor 14 outputs an ON signal to the control portion 26. On the other hand, when the membrane switch of the rear seat occupancy sensor 14 is OFF, the rear seat occupancy sensor 14 outputs an OFF signal to the control portion 26. Incidentally, the rear seat occupancy sensor 14 does not distinguish the person from the piece of luggage and vice versa, as the object present on the rear seat 58.

The luggage carriage sensor 15 is a sensor which detects that luggage is carried on the carrier 59, and which is provided in the carriage 59, as shown in FIG. 3. For example, the luggage carriage sensor 15 is provided with a push-button switch. For example, a small hole is formed in a face of the carrier 59 where the luggage is carried (luggage carriage face). The aforementioned push-button switch is disposed inside the hole. When no luggage is carried on the carrier 59, a movable portion of the push-button switch protrudes from the luggage carriage face. On this occasion, the push-button switch is OFF. On the other hand, when luggage is carried on the carrier 59, the movable portion of the push-button switch is pushed by the luggage so as to slip into the aforementioned hole accordingly. Thus, the push-button switch is turned ON. Even when, for example, light luggage weighing merely about 1 kg is carried on the carrier 59, the push-button switch is turned ON. Based on ON/OFF of the push-button switch, it is possible to detect whether the luggage is carried on the carrier 59 or not. When the push-button switch of the luggage carriage sensor 15 is ON, the luggage carriage sensor 15 outputs an ON signal to the control portion 26. On the other hand, when the push-button switch of the luggage carriage sensor 15 is OFF, the luggage carriage sensor 15 outputs an OFF signal to the control portion 26.

The vehicle control device 11 recognizes whether the saddle-ridden type vehicle 41 is in the double riding state or the luggage is carried on the saddle-ridden type vehicle 41 or not, i.e. whether the passenger or the luggage is present on the saddle-ridden type vehicle 41 or not, based on the ON signals or the OFF signals outputted from the load cell 12, the driver's seat occupancy sensor 13, the rear seat occupancy sensor 14 and the luggage carriage sensor 15 respectively in a vehicle control process which will be described later. Incidentally, the passenger and the luggage are specific examples of an on-vehicle object respectively. The rear seat occupancy sensor 14, the luggage carriage sensor 15 and the control portion 26 are specific examples of an on-vehicle object recognizing portion.

Further, as shown in FIG. 1, the vehicle control device 11 is provided with a GPS (Global Positioning System) receiver 17, a vehicle speed sensor 18, an acceleration sensor 19, an angular speed sensor 20, and an inclination sensor 21.

The GPS receiver 17 is a device which receives positioning information indicating a current position of the saddle-ridden type vehicle 41 measured by GPS, and which is attached to a vehicle body of the saddle-ridden type vehicle 41. The GPS receiver 17 outputs the received positioning information to the control portion 26. The vehicle speed sensor 18, the acceleration sensor 19 and the angular speed sensor 20 are devices which detect speed, acceleration, and angular speed of the saddle-ridden type vehicle 41 respectively, and which are attached to the vehicle body of the saddle-ridden type vehicle 41 respectively. The vehicle speed sensor 18, the acceleration sensor 19 and the angular speed sensor 20 output, to the control portion 26, detection signals corresponding to the speed, the acceleration and the angular speed of the saddle-ridden type vehicle 41 respectively.

The inclination sensor 21 is a device which detects a bank angle (an inclination angle in the left/right direction) of the saddle-ridden type vehicle 41, and which is attached to the vehicle body of the saddle-ridden type vehicle 41. The inclination sensor 21 outputs a detection signal corresponding to the bank angle of the saddle-ridden type vehicle 41 to the control portion 26.

The vehicle control device 11 recognizes whether the saddle-ridden type vehicle 41 has stopped in the middle of or immediately before an uphill slope or not, based on the positioning information outputted from the GPS receiver 17, the detection signals outputted from the vehicle speed sensor 18, the acceleration sensor 19 and the angular speed sensor 20, and map data 28 stored in a storage portion 27 in the vehicle control process which will be described later. Incidentally, the GPS receiver 17, the vehicle speed sensor 18, the acceleration sensor 19, the angular speed sensor 20, the map data 28 and the control portion 26 are specific examples of a stop position recognizing portion and a gradient detecting portion. In addition, as will be described later, after the vehicle control device 11 starts engine output increase control on the saddle-ridden type vehicle 41 which has started in the double riding state or the luggage carriage state from the middle of or immediately before the uphill slope in the vehicle control process, the vehicle control device 11 recognizes a running state of the saddle-ridden type vehicle 41 based on the speed of the saddle-ridden type vehicle 41 detected by the vehicle speed sensor 18 or the bank angle of the saddle-ridden type vehicle 41 detected by the inclination sensor 21, and determines whether to stop the engine output increase control based on a result of the recognition. Incidentally, the vehicle speed sensor 18 is a specific example of a speed detecting portion, and the inclination sensor 21 is a specific example of an inclination detecting portion.

Further, the vehicle control device 11 is provided with a raindrop sensor 22, a temperature sensor 23, and an ultrasonic sensor 24. The raindrop sensor 22 is a device which detects presence/absence or the degree of raindrops. The temperature sensor 23 is a device which detects an air temperature of a place where the saddle-ridden type vehicle 41 is running. The ultrasonic sensor 24 is used as a device which detects a state of a road surface of a road on which the saddle-ridden type vehicle 41 is running. The raindrop sensor 22, the temperature sensor 23 and the ultrasonic sensor 24 are attached to the vehicle body of the saddle-ridden type vehicle 41. In addition, the raindrop sensor 22, the temperature sensor 23 and the ultrasonic sensor 24 output, to the control portion 26, detection signals corresponding to the presence/absence or the degree of the raindrops, the air temperature and the state of the road surface respectively. The vehicle control device 11 determines whether the road surface of the road is slippery or not based on the detection signals outputted from the raindrop sensor 22, the temperature sensor 23 and the ultrasonic sensor 24 respectively in the vehicle control process.

Further, the vehicle control device 11 is provided with the control portion 26 and the storage portion 27. The control portion 26 has a CPU (Central Processing Unit) which performs the vehicle control process which will be described later. For example, the control portion 26 can be implemented by the CPU which is embedded into an ECU (engine control unit) provided in the saddle-ridden type vehicle 41 and which executes a computer program for performing the vehicle control process. Incidentally, the control portion 26 is a specific example of an engine control portion. For example, the storage portion 27 has a flash memory or a hard disk drive etc. and is provided in the vehicle body of the saddle-ridden type vehicle 41. The map data 28 and a control map 29 etc. are stored in the storage portion 27.

In addition, the control portion 26 controls a fuel injecting device 32 and an electronic control throttle 33 which are provided in the saddle-ridden type vehicle 41. The fuel injecting device 32 is a device which injects fuel into air sucked into a cylinder of the engine 54 of the saddle-ridden type vehicle 41 to generate a fuel-air mixture. The electronic control throttle 33 is a device which changes an amount of the air or the fuel-air mixture sucked into the cylinder of the engine 54. A throttle opening of the electronic control throttle 33 is basically controlled in accordance with an accelerator operation amount (accelerator opening) detected by an accelerator position sensor 31. A relation between the accelerator opening and the throttle opening can be changed by control of the control portion 26. The control portion 26 can intervene in a driver's accelerator operation to control a fuel injection amount of the fuel injecting device 32 to change a fuel amount supplied to the engine 54. In addition, the control portion 26 can intervene in the driver's accelerator operation to control the throttle opening of the electronic control throttle 33 to change the amount of the air or the air-fuel mixture sucked into the engine 54. The control portion 26 can control the fuel injection amount and the throttle opening in this manner so as to change the engine output with respect to the accelerator opening (the relation between the accelerator opening and the engine output).

Figure 4:
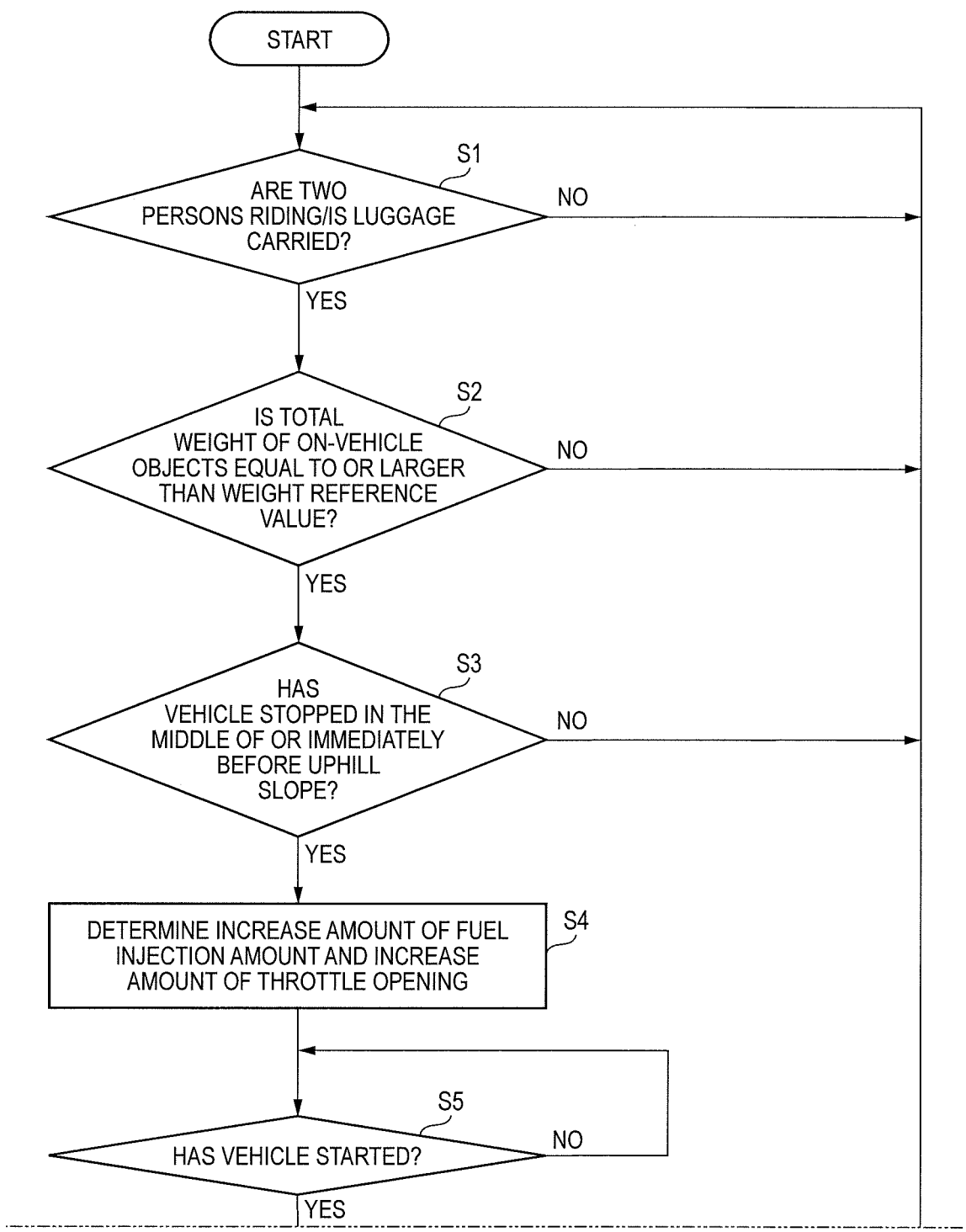
FIG. 4 is a flow chart showing a vehicle control process in the vehicle control device according to the Example of the invention.
Figures 1, 5:
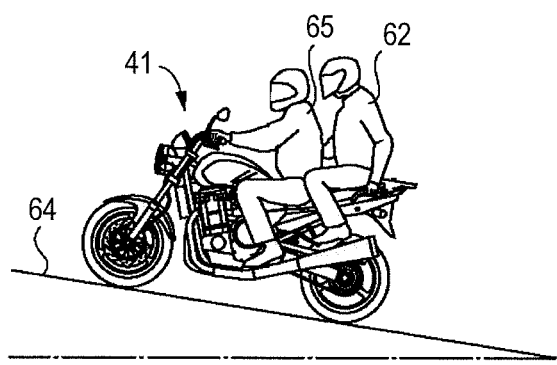
Figures 2, 5:
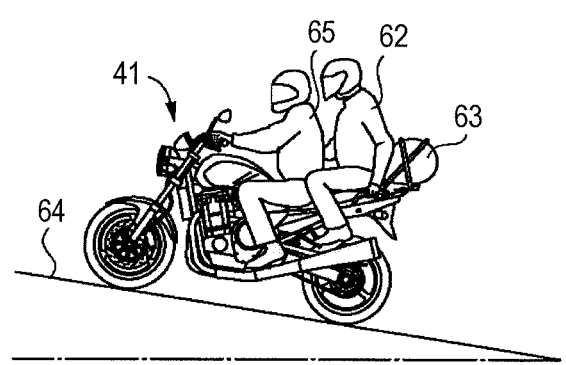
Figures 3, 5:
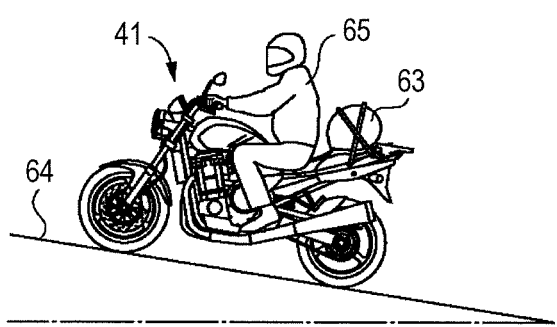
Figures 4, 5:
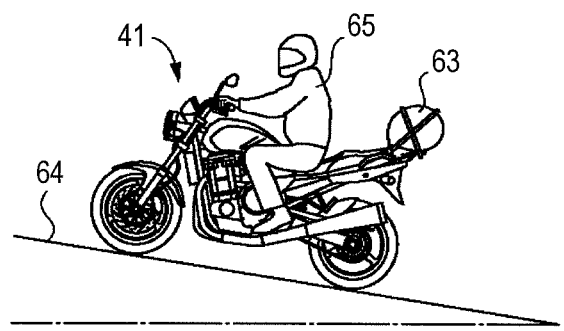
Figure 6:
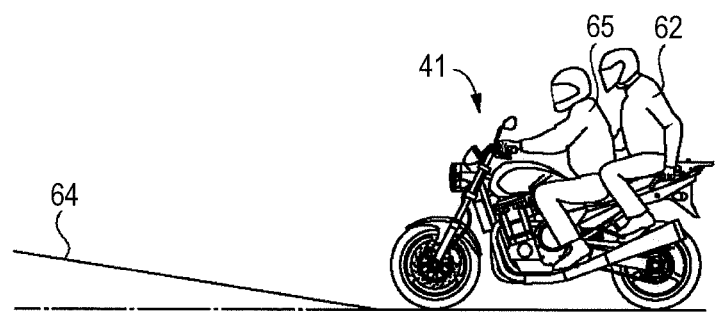
FIG. 6 is an explanatory view showing a state in which the saddle-ridden type vehicle on which the two persons are riding has stopped immediately before the uphill slope.

FIG. 4 shows the vehicle control process in the vehicle control device 11. FIGS. 5-1 to 5-4 show states in which the saddle-ridden type vehicle 41 ridden by two persons or the saddle-ridden type vehicle 41 having luggage carried thereon has stopped in the middle of an uphill slope 64. FIG. 6 shows a state in which the saddle-ridden type vehicle 41 ridden by the two persons has stopped immediately before the uphill slope 64.

The vehicle control device 11 performs the vehicle control process shown in FIG. 4 during operation of the engine 54. In the vehicle control process, first, the control portion 26 of the vehicle control device 11 determines whether the saddle-ridden type vehicle 41 is in the double riding state or the luggage is carried on the saddle-ridden type vehicle 41 or not (step S1). The control portion 26 performs the determination, for example, as follows. That is, when a passenger is sitting on the rear seat 58 or when the luggage is carried on the rear seat 58, an ON signal is outputted from the rear seat occupancy sensor 14. When the luggage is carried on the carrier 59, an ON signal is outputted from the luggage carriage sensor 15. When the ON signal is outputted from one or both of the rear seat occupancy sensor 14 and the luggage carriage sensor 15, the control portion 26 determines that the saddle-ridden type vehicle 41 is in the double riding state or the luggage is carried on the saddle-ridden type vehicle 41. On the other hand, when no ON signal is outputted from any of the rear seat occupancy sensor 14 and the luggage carriage sensor 15, the control portion 26 determines that the saddle-ridden type vehicle 41 is in a single riding state and no luggage is carried on the saddle-ridden type vehicle 41.

When the saddle-ridden type vehicle 41 is in the double riding state or the luggage is carried on the saddle-ridden type vehicle 41 (step S1: YES), the control portion 26 determines whether a total weight of at least one on-vehicle object is equal to or larger than a weight reference value or not (step S2). The "total weight of at least one on-vehicle object" is the sum of the weight of a person other than the driver present on the saddle-ridden type vehicle 41 and the weight of the luggage present on the saddle-ridden type vehicle 41. Specifically, when a passenger 62 sits on the rear seat 58 but no luggage is carried on the carrier 59, as shown in FIG. 5-1, the total weight of at least one on-vehicle object is equal to the weight of the passenger 62. When the passenger 62 sits on the rear seat 58 and a piece of luggage 63 is carried on the carrier 59, as shown in FIG. 5-2, the total weight of at least one on-vehicle object is equal to the sum of the weight of the passenger 62 and the weight of the piece of luggage 63 carried on the carrier 59. When the piece of luggage 63 is carried on the rear seat 58 but no luggage is carried on the carrier 59, as shown in FIG. 5-3, the total weight of at least one on-vehicle object is equal to the weight of the piece of luggage 63 carried on the rear seat 58. When no luggage is carried on the rear seat 58 but the piece of luggage 63 is carried on the carrier 59, as shown in FIG. 5-4, the total weight of at least one on-vehicle object is equal to the weight of the piece of luggage 63 carried on the carrier 59. Although not shown, when one piece of luggage is carried on the rear seat 58 and another piece of luggage is carried on the carrier 59, the total weight of at least one on-vehicle object is equal to the sum of the weight of the piece of luggage carried on the rear seat 58 and the weight of the piece of luggage carried on the carrier 59. In addition, the aforementioned weight reference value is a value which has been set in advance, such as 10 kg. Incidentally, the reference sign 65 in FIGS. 5-1 to 5-4 designates the driver.

In addition, the control portion 26 recognizes the total weight of at least one on-vehicle object, for example, as follows. That is, the weight of the driver is stored in the storage portion 27 of the vehicle control device 11. For example, assume that the saddle-ridden type vehicle 41 stops at a horizontal place, the driver sits on the driver's seat 57, no passenger sits on the rear seat 58, no luggage is carried on the rear seat 58 and no luggage is carried on the carrier 59 when the driver starts to use the saddle-ridden type vehicle 41 etc. In this case, the control portion 26 measures force applied to the pair of the seat rails 46 based on a detection signal outputted from the load cell 12. The measurement result corresponds to the weight of the driver. The control portion 26 stores and holds the measurement result as the weight of the driver in the storage portion 27. On the other hand, in the vehicle control process, the control portion 26 measures force currently applied to the pair of the seat rails 46 based on a detection signal currently outputted from the load cell 12. The measurement result corresponds to the sum of the weight of the driver and the total weight of at least one on-vehicle object. Next, the control portion 26 calculates the current total weight of at least one on-vehicle object by subtracting the weight of the driver read from the storage portion 27, from the sum of the weight of the driver and the total weight of at least one on-vehicle object, which has been currently measured.

When the total weight of at least one on-vehicle object is equal to or larger than the weight reference value (step S2: YES), the control portion 26 successively determines whether the saddle-ridden type vehicle 41 has stopped in the middle of or immediately before an uphill slope or not (step S3). The control portion 26 performs the determination, for example, as follows. That is, the control portion 26 first determines whether the saddle-ridden type vehicle 41 has stopped or not, for example, based on a detection signal outputted from the vehicle speed sensor 18, etc. When the saddle-ridden type vehicle 41 has stopped, the control portion 26 next determines whether the saddle-ridden type vehicle 41 is currently positioned in the middle of or immediately before the uphill slope or not, using the GPS receiver 17, the vehicle speed sensor 18, the acceleration sensor 19, the angular speed sensor 20 and the map data 28.

Here, a specific example of a determination method for determining whether the saddle-ridden type vehicle 41 is positioned in the middle of the uphill slope or not will be described. First, the control portion 26 detects a current position and direction of the saddle-ridden type vehicle 41 by satellite navigation and autonomous navigation, using positioning information outputted from the GPS receiver 17 and detection signals outputted from the vehicle speed sensor 18, the acceleration sensor 19 and the angular speed sensor 20. Next, the control portion 26 refers to the map data 28 to specify a road where the saddle-ridden type vehicle 41 is currently positioned. Next, the control portion 26 determines whether the road where the saddle-ridden type vehicle 41 is currently positioned is an uphill slope or not. That is, road information indicating gradients and inclination directions of respective roads are contained in the map data 28. The control portion 26 refers to the road information to recognize a gradient and an inclination direction of the road where the saddle-ridden type vehicle 41 is currently positioned. When the gradient of the road where the saddle-ridden type vehicle 41 is currently positioned is equal to or larger than a gradient reference value and the direction of the saddle-ridden type vehicle 41 is a direction of climbing the road, the control portion 26 determines that the road where the saddle-ridden type vehicle 41 is currently positioned is the uphill slope. In this case, the control portion 26 determines that the saddle-ridden type vehicle 41 is positioned in the middle of the uphill slope 64, as shown in any of FIGS. 5-1 to 5-4. On the other hand, when the gradient of the road where the saddle-ridden type vehicle 41 is currently positioned is not equal to or larger than the gradient reference value or the direction of the saddle-ridden type vehicle 41 is not the direction of climbing the road, the control portion 26 determines that the road where the saddle-ridden type vehicle 41 is currently positioned is not the uphill slope. In this case, the control portion 26 determines that the saddle-ridden type vehicle 41 is not positioned in the middle of the uphill slope. It is desirable that the aforementioned gradient reference value is a value which has been set in advance, such as about 2% to 5%.

In addition, a specific example of a recognition method for recognizing that the saddle-ridden type vehicle 41 is positioned immediately before the uphill slope will be described. First, the control portion 26 determines whether the saddle-ridden type vehicle 41 is positioned in the middle of the uphill slope or not by the aforementioned determination method. When the saddle-ridden type vehicle 41 is not positioned in the middle of the uphill slope, the control portion 26 calculates a front position which is a predetermined distance (e.g. 1 m to 3 m) forward from the current position of the saddle-ridden type vehicle 41, from the current position and direction of the saddle-ridden type vehicle 41. Next, the control portion 26 replaces the current position of the saddle-ridden type vehicle 41 with the calculated front position, and determines whether a road corresponding to the front position is an uphill slope or not by the aforementioned determination method. When the road corresponding to the front position is the uphill slope, the control portion 26 determines that the saddle-ridden type vehicle 41 is positioned immediately before the uphill slope 64, as shown in FIG. 6. On the other hand, when the road corresponding to the front position is not the uphill slope, the control portion 26 determines that the saddle-ridden type vehicle 41 is not positioned immediately before the uphill slope.

When the saddle-ridden type vehicle 41 has stopped in the middle of or immediately before the uphill slope (step S3: YES), the control portion 26 determines an increase amount $\underline{m}$ of a fuel injection amount and an increase amount $\underline{n}$ of a throttle opening (step S4). The control portion 26 determines the increase amount $\underline{m}$ of the fuel injection amount and the increase amount $\underline{n}$ of the throttle opening based on the total weight of at least one on-vehicle object recognized in the step S2 and the gradient of the road corresponding to the current position of the saddle-ridden type vehicle 41 (or the front position the predetermined distance forward from the current position) recognized in the step S3. Specifically, to determine the increase amount $\underline{m}$ of the fuel injection amount of the increase amount $\underline{n}$ of the throttle opening, the control portion 26 uses the control map 29 stored in the storage portion 27. A relation among a predetermined range of the total weight of at least one on-vehicle object (e.g. 10 kg, 11 kg, 12 kg, . . . , 200 kg), a predetermined range of the gradient of the road (e.g. 2%, 3%, 4%, . . . , 50%), the increase amount $\underline{m}$ of the fuel injection amount and the increase amount $\underline{n}$ of the throttle opening is described in the control map 29. The control map 29 has been generated in advance based on a test or a simulation. When the total weight of at least one on-vehicle object recognized in the step S2 and the gradient of the road recognized in the step S3 are inputted to the control map 29, the increase amount $\underline{m}$ of the fuel injection amount and the increase amount $\underline{n}$ of the throttle opening corresponding to the values of the total weight of at least one on-vehicle object and the gradient of the road are obtained. Specifically, the increase amount $\underline{m}$ of the fuel injection amount and the increase amount $\underline{n}$ of the throttle opening which are obtained thus are larger as the current total weight of at least one on-vehicle object of the saddle-ridden type vehicle 41 is larger. In addition, the increase amount $\underline{m}$ of the fuel injection amount and the increase amount $\underline{n}$ of the throttle opening which are obtained thus are larger as the gradient of the uphill slope which the saddle-ridden type vehicle 41 climbs is larger.

Successively, the control portion 26 determines whether the saddle-ridden type vehicle 41 has started or not, for example, based on the detection signal outputted from the vehicle speed sensor 18 etc. (step S5). When the saddle-ridden type vehicle 41 has started (step S5: YES), the control portion 26 starts engine output increase control (step S6).

The control portion 26 performs the engine output increase control, for example, as follows. The driver manually operates the accelerator to open the accelerator. In the case where a transmission of the saddle-ridden type vehicle 41 is of a manual type, the driver successively operates a clutch lever to connect a clutch to start the saddle-ridden type vehicle 41. In the case where the engine output increase control is not performed, i.e. the case where the saddle-ridden type vehicle 41 ridden by one person and having no luggage carried on the rear seat 58 and the carrier 59 starts (or the case where the saddle-ridden type vehicle 41 starts from a horizontal place not immediately before the uphill slope), the fuel injection amount is a fuel injection amount $\underline{i}$ corresponding to an accelerator operation amount manually performed by the driver, i.e. an accelerator opening. In the case where the engine output increase control is not performed, the throttle opening is a throttle opening $t$ corresponding to the accelerator opening. On the other hand, when performing the engine output increase control, the control portion 26 increases the fuel injection amount $i$ corresponding to the accelerator opening by the increase amount $m$ determined in the step S4. As a result, the fuel injection amount is equal to i+m. In addition, when performing the engine output increase control, the control portion 26 increases the throttle opening $t$ corresponding to the accelerator opening by the increase amount $n$ determined in the step S4. As a result, the throttle opening is equal to t+n. In this manner, the control portion 26 increases the fuel injection amount and the throttle opening in the engine output increase control. Accordingly, the engine output with respect to the accelerator opening increases.

In addition, in the step S4, the increase amounts $m$ and $n$ are determined in accordance with the current total weight of at least one on-vehicle object of the saddle-ridden type vehicle 41 and the gradient of the uphill slope which the saddle-ridden type vehicle 41 climbs. Accordingly, an increase amount of the engine output due to the engine output increase control (i.e. a difference between an engine output with respect to the accelerator opening when the engine output increase control is not performed and an engine output with respect to the accelerator opening when the engine output increase control is performed) changes in accordance with the current total weight of at least one on-vehicle object of the saddle-ridden type vehicle 41 or the gradient of the uphill slope which the saddle-ridden type vehicle 41 climbs. Specifically, the increase amount of the engine output is larger as the current total weight of at least one on-vehicle object of the saddle-ridden type vehicle 41 is larger. In addition, the increase amount of the engine output is larger as the gradient of the uphill slope which the saddle-ridden type vehicle 41 climbs is larger.

In addition, in the engine output increase control, the control portion 26 determines whether a road surface of the road where the saddle-ridden type vehicle 41 is currently positioned is slippery or not, based on detection signals outputted from the raindrop sensor 22, the temperature sensor 23 and the ultrasonic sensor 24 respectively. When the road surface of the road where the saddle-ridden type vehicle 41 is currently positioned is slippery, the control portion 26 reduces the increase amount $m$ of the fuel injection amount or the increase amount $n$ of the throttle opening in comparison with a case where the road surface is not slippery. As a result, the engine output increases due to the engine output increase control, but an increase amount of the engine output is smaller than that in the case where the road surface is not slippery.

After starting the engine output increase control, the control portion 26 determines whether the saddle-ridden type vehicle 41 has climbed the uphill slope completely or not (step S7). The control portion 26 performs the determination, for example, basically by the same method as the determination method performed in the step S3 for determining whether the saddle-ridden type vehicle 41 is positioned in the middle of the uphill slope or not. That is, the control portion 26 detects the current position and direction of the saddle-ridden type vehicle 41 by the GPS receiver 17, the vehicle speed sensor 18, the acceleration sensor 19 and the angular speed sensor 20, and determines whether the current position of the saddle-ridden type vehicle 41 has reached a highest position of the uphill slope or not, based on the map data 28. When the current position of the saddle-ridden type vehicle 41 has reached the highest position of the uphill slope, the control portion 26 determines that the saddle-ridden type vehicle 41 has climbed the uphill slope completely. Otherwise, the control portion 26 determines that the saddle-ridden type vehicle 41 has not climbed the uphill slope completely yet.

When the saddle-ridden type vehicle 41 has not climbed the uphill slope completely yet (step S7: NO), the control portion 26 determines whether speed of the saddle-ridden type vehicle 41 exceeds a speed reference value or not, based on the detection signal outputted from the vehicle speed sensor 18 (step S8). The speed reference value is a value which has been set in advance as a speed (e.g. 10 km/h) indicating that the saddle-ridden type vehicle has reached a state in which the saddle-ridden type vehicle is climbing the uphill slope stably.

When the speed of the saddle-ridden type vehicle 41 does not exceed the speed reference value (step S8: NO), the control portion 26 determines whether the saddle-ridden type vehicle 41 has stopped or not after the saddle-ridden type vehicle 41 started (step S9), for example, based on the detection signal outputted from the vehicle speed sensor 18.

When the saddle-ridden type vehicle 41 has not stopped after the saddle-ridden type vehicle 41 started (step S9: NO), the control portion 26 determines whether a bank angle of the saddle-ridden type vehicle 41 exceeds a bank angle reference range or not, based on a detection signal outputted from the inclination sensor 21 (step S10). The bank angle reference range is a range which has been set in advance as a bank angle range in which the saddle-ridden type vehicle is unlikely to be inclined leftward or rightward to fall down. The bank angle at which the saddle-ridden type vehicle 41 stands erectly is 0 degrees. When the saddle-ridden type vehicle 41 is inclined to one of the left and the right, the bank angle is assumed as positive. When the saddle-ridden type vehicle 41 is inclined to the other of the left and the right, the bank angle is assumed as negative. On this assumption, the bank angle reference range is, for example, from −20 degrees to 20 degrees.

When the bank angle of the saddle-ridden type vehicle 41 does not exceed the bank angle reference range (step S10: NO), the control portion 26 returns the process to the step S7. Thus, the engine output increase control is continued.

On the other hand, when the saddle-ridden type vehicle 41 has climbed the uphill slope completely (step S7: YES) or the speed of the saddle-ridden type vehicle 41 exceeds the speed reference value (step S8: YES) after the engine output increase control is started, the control portion 26 stops the engine output increase control (step S11).

When the saddle-ridden type vehicle 41 has stopped again in the middle of the uphill slope (step S9: YES) after the engine output increase control is started, the control portion 26 also stops the engine output increase control (step S11).

When the saddle-ridden type vehicle 41 is inclined largely to the left or the right and the bank angle of the saddle-ridden type vehicle 41 exceeds the bank angle reference range (step S10: YES) after the engine output increase control is started, the control portion 26 also stops the engine output increase control (step S11). After the engine output increase control has stopped, the process returns to the step S1.

According to the vehicle control device 11 in the Example of the invention, as described above, even when the saddle-ridden type vehicle 41 ridden by two persons or having luggage carried thereon has stopped in the middle of or immediately before an uphill slope, the driver can start the saddle-ridden type vehicle 41 smoothly. That is, when the saddle-ridden type vehicle 41 ridden by the two persons or having the luggage carried thereon starts from the middle of or immediately before the uphill slope, the engine output increase control is executed. Thus, the engine output with respect to the accelerator opening increases and the engine torque increases, in comparison with when the saddle-ridden type vehicle 41 ridden by one person and having no luggage carried thereon starts from the middle of or immediately before the uphill slope (or when the saddle-ridden type vehicle 41 ridden by the two persons and having the luggage carried thereon starts from a horizontal place not immediately before the uphill slope). Accordingly, even in the case where the saddle-ridden type vehicle 41 ridden by the two persons or having the luggage carried thereon starts from the middle of or immediately before the uphill slope, the driver can start the saddle-ridden type vehicle 41 smoothly by an equivalent accelerator operation to that in the case where the saddle-ridden type vehicle 41 ridden by the one person and having no luggage carried thereon starts from the middle of or immediately before the uphill slope (or the case where the saddle-ridden type vehicle 41 ridden by the two persons or having the luggage carried thereon starts from the horizontal place not immediately before the uphill slope).

In the case where the saddle-ridden type vehicle 41 ridden by the two persons or having the luggage carried thereon starts from the middle of or immediately before the uphill slope, the weight of the two riders or the luggage and the gravity in an opposite direction to the direction of climbing the uphill slope are applied to the saddle-ridden type vehicle 41. However, by the engine torque increasing due to the engine output increase control, the behavior of the saddle-ridden type vehicle 41 during the start can be stabilized, the saddle-ridden type vehicle 41 can be suppressed from running zigzag in the left/right direction, and acceleration of the saddle-ridden type vehicle 41 can be suppressed from being slowed down. Accordingly, the driver can easily perform the middle-of-slope start operation and the immediately-before-slope start operation in the double riding state or the luggage carriage state. Thus, it is possible to prevent the driver from acting clumsily during the start to thereby hinder running of other vehicles and cause congestion.

According to the vehicle control device 11 in the Example of the invention, as soon as the saddle-ridden type vehicle ridden by the two persons or having the luggage carried thereon starts from the middle of or immediately before the uphill slope, the engine output increase control is started. Then, when the speed of the saddle-ridden type vehicle 41 exceeds the speed reference value, the engine output increase control stops. Thus, after the start, the fuel injection amount and the throttle opening return to the fuel injection amount $\underline{i}$ and the throttle opening $\underline{t}$ with respect to the accelerator opening respectively so that the engine output can be controlled faithfully in accordance with the accelerator operation amount performed by the driver. Thus, the saddle-ridden type vehicle 41 can be prevented from accelerating against the driver's prediction so that operability of the saddle-ridden type vehicle 41 can be enhanced.

In addition, according to the vehicle control device 11 in the Example of the invention, as soon as the saddle-ridden type vehicle 41 ridden by the two persons or having the luggage carried thereon starts from the middle of or immediately before the uphill slope, the engine output increase control is started. Then, when the bank angle of the saddle-ridden type vehicle 41 exceeds the bank angle reference range, the engine output increase control stops. Thus, in a case where the driver is extremely unskilled at driving, or a case where there arises such an abnormal situation that a wheel runs onto a large stone or a falling object on the road surface, the saddle-ridden type vehicle 41 may be likely to be inclined largely to the left or the right to thereby run zigzag largely or fall down immediately after the start. In such a case, the engine output increase control is stopped so that the driver can put his/her foot on the road surface to stop the saddle-ridden type vehicle 41 easily. Thus, the saddle-ridden type vehicle 41 can be prevented from running zigzag largely or falling down.

In addition, according to the vehicle control device 11 in the Example of the invention, the engine output increase control is not performed when the total weight of at least one on-vehicle object is lower than the weight reference value. In a case where the weight of the luggage carried on the saddle-ridden type vehicle 41 is light, it is not difficult to perform any of the middle-of-slope start operation and the immediately-before-slope start operation. In such a case, the engine output increase control is not performed so that fuel efficiency of the saddle-ridden type vehicle 41 can be improved.

In addition, according to the engine output increase control in the vehicle control device 11 in the Example of the invention, the increase amount of the engine output can be changed in accordance with the total weight of at least one on-vehicle object of the saddle-ridden type vehicle 41 and the gradient of the uphill slope which the saddle-ridden type vehicle 41 climbs. Thus, the weight of the passenger or the luggage may be light or heavy, or the uphill slope may be steep or gentle. In any of these cases, when the saddle-ridden type vehicle 41 ridden by the two persons or having the luggage carried thereon starts from the middle of or immediately before the uphill slope, the driver can start the saddle-ridden type vehicle 41 smoothly by an equivalent accelerator operation to that when the saddle-ridden type vehicle 41 ridden by the one person and having no luggage carried thereon starts from the middle of or immediately before the uphill slope (or when the saddle-ridden type vehicle 41 ridden by the two persons or having the luggage carried thereon starts from the horizontal place not immediately before the uphill slope). Thus, according to the vehicle control device 11, start support can be attained with high quality.

In addition, according to the vehicle control device 11 in the Example of the invention, the fuel injection amount of the fuel injecting device 32 and the throttle opening of the electronic control throttle 33 are controlled and the engine output is increased. With this configuration, the increase amount of the engine output can be controlled accurately in accordance with the total weight of at least one on-vehicle object of the saddle-ridden type vehicle 41 and the gradient of the uphill slope which the saddle-ridden type vehicle 41 climbs.

In addition, according to the vehicle control device 11 in the Example of the invention, when the road surface of the road where the saddle-ridden type vehicle 41 is positioned is slippery, the increase amount of the engine output is made smaller than that when the road surface is not slippery. Thus, the vehicle can be prevented from starting unstably. For example, a driving wheel (rear wheel 53) of the saddle-ridden type vehicle 41 can be prevented from slipping and running idle on a frozen road surface during the start.

Incidentally, the case where the passenger sitting on the rear seat 58 is detected by the rear seat occupancy sensor 14 provided in the seat 56 has been described by way of example in the aforementioned Example. However, the invention is not limited thereto. For example, pressure sensors such as load cells may be provided in the passenger steps 61 of the saddle-ridden type vehicle 41. Thus, the passenger putting his/her feet on the passenger steps 61 can be detected by the pressure sensors so that it can be recognized that the passenger has sat on the rear seat 58. According to this method, it is possible to distinguish the case where the passenger has sat on the rear seat 58 from the case where the luggage has been carried on the rear seat 58. Focus may be placed on the fact that the position of the center of gravity as a whole varies between the case where the passenger has sat on the rear seat 58 and the case where the luggage has been carried on the rear seat 58. Accordingly, the increase amount of the engine output when the saddle-ridden type vehicle 41 starts from the middle of or immediately before the uphill slope may be varied between the former case and the latter case.

In addition, the following case has been described by way of example in the aforementioned Example. That is, the total weight of the weight of the driver, the weight of the passenger (or the weight of the piece of luggage carried on the rear seat 58) and the weight of the piece of luggage carried on the carriage 59 is measured by the load cell 12 provided on the front end portions of the seat rails 46, and the total weight of at least one on-vehicle object is calculated by subtracting the weight of the driver which has been stored in advance from the measured value of the total weight. However, the invention is not limited thereto. For example, devices which can measure weights may be provided in the rear seat 58 and the carrier 59 respectively so that the total weight of at least one on-vehicle object can be calculated by adding the measured value of the weight of the passenger (or the weight of the piece of luggage carried on the rear seat 58) and the measured value of the weight of the piece of luggage carried on the carrier 59. In addition, the driver's seat occupancy sensor 13 may be removed from the configuration of the aforementioned Example.

In addition, in order to acquire the total weight of at least one on-vehicle object, the force applied to the pair of the seat rails 46 on which the seat 56 or the carrier 59 is supported does not have to be measured by the load sensor 12 as in the aforementioned Example, but, for example, a contraction amount of a rear suspension or a rear cushion or a swinging amount of the swing arm 52 may be measured by a sensor alternatively.

In addition, the following case has been described by way of example in the aforementioned Example. That is, the weight reference value relevant to the total weight of at least one on-vehicle object is set, for example, at 10 kg in order to perform the engine output increase control not only in the double riding case but also the luggage carriage case. However, the weight reference value may be set at a larger value in order to perform the engine output increase control mainly only when the driver and an adult passenger are riding on the vehicle. In this case, an average weight of Japanese adult men is about 66 kg and an average weight of Japanese adult women is about 53 kg according to a recent statistic survey ("average values of length and weight by gender, year and age" according to data in the homepage of Ministry of Health, Labour and Welfare of Japan on Nov. 9, 2016). Accordingly, the weight reference value is preferably set, for example, at about 50 kg. Alternatively, if a kid as young as a schoolchild is included in the passenger, the weight reference value may be set, for example, at about 20 kg.

In addition, the case where positioning of the current position of the saddle-ridden type vehicle 41 and the map data are compared with each other in order to determine that the saddle-ridden type vehicle 41 is positioned in the middle of the uphill slope has been described by way of example in the aforementioned Example. However, such determination may be made based on forward/backward inclination of the saddle-ridden type vehicle 41 measured by the inclination sensor 21.

In addition, the case where both the fuel injection amount of the fuel injecting device 32 and the throttle opening of the electronic control throttle 33 are increased in the engine output increase control has been described by way of example in the aforementioned Example. However, one of the fuel injection amount and the throttle opening may be increased.

In addition, the case where the invention is applied to the saddle-ridden type vehicle 41 provided with the seat 56 in which the driver's seat 57 and the rear seat 58 are integrated with each other has been described by way of example in the aforementioned Example. However, the invention can be also applied to a saddle-ridden type vehicle in which seats are provided separately as a driver's seat and a rear seat (saddle-ridden type vehicle provided with separate type seats). In addition, the invention can be also applied to a saddle-ridden type vehicle of a type having no carrier or a saddle-ridden type vehicle of a type having no rear seat for a passenger. In addition, the invention is not limited to a naked type or sports type motorcycle shown in FIG. 2 but can be also applied to an off-road type motorcycle, scooter, motor tricycle, or the like.

In addition, the invention can be changed suitably without being against the gist or idea of the invention which can be read from the scope of Claims and the entirety of the description. Any vehicle control device having such a change may be also included in the technical idea of the invention.

What is claimed is:

1. A vehicle control device comprising:
    at least one hardware processor configured to implement:
        an on-vehicle object recognizing sensor that recognizes whether an on-vehicle object that is a person other than a driver or luggage is present on a saddle-ridden type vehicle;
        a stop position recognizing portion comprising a global positioning satellite (GPS) receiver, a vehicle speed sensor, an acceleration sensor, and an angular speed sensor, that recognizes whether the saddle-ridden type vehicle has stopped in middle of or immediately before an uphill slope; and
    wherein the at least one hardware processor controls an engine output in the saddle-ridden type vehicle, wherein:
        when the on-vehicle object is present on the saddle-ridden type vehicle and the saddle-ridden type vehicle has stopped in the middle of or immediately before the uphill slope based on recognition results of the on-vehicle object recognizing sensor and the stop position recognizing portion, the at least one hardware processor performs engine output increase control to increase the engine output with respect to an accelerator opening in the saddle-ridden type vehicle during start of the saddle-ridden type vehicle, in comparison with when the on-vehicle object is not present on the saddle-ridden type vehicle and the saddle-ridden type vehicle has stopped in the middle of or immediately before the uphill slope or when the on-vehicle object is present on the saddle-ridden type vehicle and the saddle-ridden type vehicle has stopped at a horizontal place not immediately before the uphill slope
        the vehicle speed sensor that detects speed of the saddle-ridden type vehicle, wherein:

the at least one hardware processor stops the engine output increase control when the speed of the saddle-ridden type vehicle exceeds a predetermined speed based on a detection result of the vehicle speed sensor;

an inclination sensor that detects a leftward or rightward inclination of the saddle-ridden type vehicle, wherein:

the at least one hardware processor stops the engine output increase control, which occurs when the on-vehicle object is present on the saddle-ridden type vehicle and the saddle-ridden type vehicle has stopped in the middle of or immediately before the uphill slope, when an angle of the leftward or rightward inclination of the saddle-ridden type vehicle exceeds a predetermined inclination angle based on a detection result of the inclination sensor.

2. The vehicle control device according to claim 1, further comprising:

a weight detector that detects a total weight of at least one on-vehicle object that is a person other than the driver or the luggage being present on the saddle-ridden type vehicle, wherein:

the at least one hardware processor does not perform the engine output increase control when the total weight of at least one on-vehicle object is lower than a predetermined weight based on a detection result of the weight detector.

3. The vehicle control device according to claim 2, wherein:

the at least one hardware processor changes an amount by which the engine output is increased in the engine output increase control in accordance with the total weight of at least one on-vehicle object detected by the weight detector.

4. The vehicle control device according to claim 1, further comprising:

a gradient detecting portion comprising the at least one processor, the GPS receiver, the speed sensor, acceleration sensor and the angular speed sensor, that detects a gradient of the uphill slope, wherein:

the at least one hardware processor changes an amount by which the engine output is increased in the engine output increase control in accordance with the gradient of the uphill slope detected by the gradient detecting portion.

5. The vehicle control device according to claim 2, further comprising:

a gradient detecting portion comprising the at least one hardware processor, the GPS receiver, the speed sensor, acceleration sensor and the angular speed sensor, that detects a gradient of the uphill slope, wherein:

the at least one processor changes an amount by which the engine output is increased in the engine output increase control in accordance with the gradient of the uphill slope detected by the gradient detecting portion.

6. The vehicle control device according to claim 3, further comprising:

a gradient detecting portion comprising the at least one hardware processor, the GPS receiver, the speed sensor, acceleration sensor and the angular speed sensor, that detects a gradient of the uphill slope, wherein:

the at least one processor changes an amount by which the engine output is increased in the engine output increase control in accordance with the gradient of the uphill slope detected by the gradient detecting portion.

7. The vehicle control device according to claim 1, wherein:

in the engine output increase control, the at least one hardware processor controls a fuel injector provided in the saddle-ridden type vehicle to control an amount of fuel supplied to an engine provided in the saddle-ridden type vehicle so as to increase the engine output with respect to the accelerator opening, or controls a throttle provided in the saddle-ridden type vehicle to control an amount of air or an air-fuel mixture sucked into the engine so as to increase the engine output with respect to the accelerator opening.

8. The vehicle control device according to claim 2, wherein:

in the engine output increase control, the at least one hardware processor controls a fuel injector provided in the saddle-ridden type vehicle to control an amount of fuel supplied to an engine provided in the saddle-ridden type vehicle so as to increase the engine output with respect to the accelerator opening, or controls a throttle provided in the saddle-ridden type vehicle to control an amount of air or an air-fuel mixture sucked into the engine so as to increase the engine output with respect to the accelerator opening.

9. The vehicle control device according to claim 3, wherein:

in the engine output increase control, the at least one hardware processor controls a fuel injector provided in the saddle-ridden type vehicle to control an amount of fuel supplied to an engine provided in the saddle-ridden type vehicle so as to increase the engine output with respect to the accelerator opening, or controls a throttle provided in the saddle-ridden type vehicle to control an amount of air or an air-fuel mixture sucked into the engine so as to increase the engine output with respect to the accelerator opening.

10. The vehicle control device according to claim 1, wherein the on-vehicle object recognizing sensor recognizes whether a person is riding on a rear seat of the saddle-ridden type vehicle.

11. The vehicle control device according to claim 2, wherein the on-vehicle object recognizing sensor recognizes whether a person is riding on a rear seat of the saddle-ridden type vehicle.

12. The vehicle control device according to claim 3, wherein the on-vehicle object recognizing sensor recognizes whether a person is riding on a rear seat of the saddle-ridden type vehicle.

* * * * *